Dec. 18, 1951　　　A. BELLEVILLE　　　2,578,916
MASSAGE APPARATUS
Filed July 17, 1950
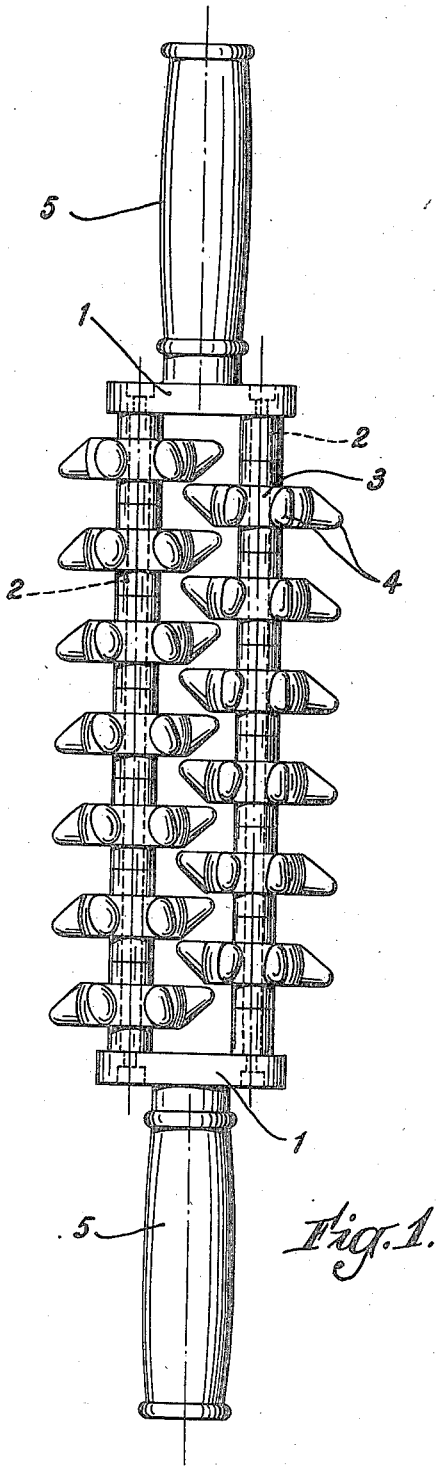
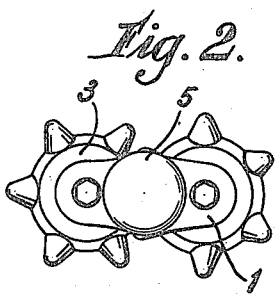
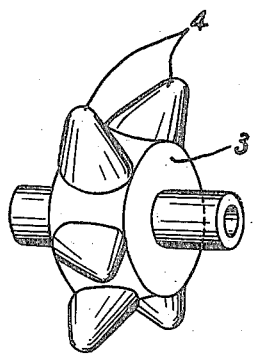
INVENTOR
ALBERT BELLEVILLE Patented Dec. 18, 1951

2,578,916

UNITED STATES PATENT OFFICE 2,578,916

MASSAGE APPARATUS

Albert Belleville, Grand-Lancy, near Geneva, Switzerland

Application July 17, 1950, Serial No. 174,236
In Switzerland September 23, 1949

4 Claims. (Cl. 128—57)

The present invention has for object an apparatus permitting of an energetic massage of the flesh by the person concerned or eventually by an assistant.

The apparatus according to the invention is characterized in that it comprises at least one set of rollers mounted on an axis and provided with teeth inclined now in one direction now in the other relative to the mean transverse plane of each roller in question.

The accompanying drawing shows by way of example one embodiment of the invention.

Fig. 1 is a general plan view of the said embodiment.

Fig. 2 is an end view of the same.

Fig. 3 is a perspective view of an isolated roller.

The apparatus shown comprises two small end bars 1 joined one to the other by two parallel rods 2. Idly mounted on these rods are rollers 3 provided with teeth 4. The teeth 4 have the general shape of rounded cones and they are alternately inclined in one direction and in the other relative to the mean transverse plane of the roller 3 in question, all as shown in Fig. 3. The rollers 3 are themselves formed of a mass of flexible rubber moulded on a hub of hard material, for example synthetic resin.

The rollers 3 are held axially on each rod 2 at a distance one from the other greater than their own width and each of the rollers mounted on one of the rods 2 is arranged in front of the space separating two successive rollers on the other rod 2. Finally, the spacing of the two rods 2 is such that the two sets of rollers interpenetrate, as clearly shown in Fig. 1.

The apparatus furthermore comprises two end handles 5 secured to the bars 1.

When such an apparatus is moved about on the body while at the same time exerting sufficient pressure, the teeth 4 of the rollers 3 sink into the flesh which they knead or massage in all directions. The apparatus thus allows of carrying out the massage known as "kneading" in a more energetic and efficient manner than would be accomplished by the tips of the fingers of an experienced masseur. The flesh is rubbed down in all directions without necessitating an exaggerated effort on the part of the operator.

Of course, the apparatus could comprise more than two rods 2 (for example three or more). The rollers might be unequal and the shape of the teeth carried by them could vary. While it is particularly desirable that the teeth be made of rubber or other flexible material, they might, without departing from the spirit of the invention, be made of a hard substance. The rollers could also be fixed to hollow axes mounted on the rods 2, so as to oblige them to rotate all together; the said two hollow axes could be joined by gearing so as to rotate in synchronism.

What I claim is:

1. A roller for rolling massage apparatus comprising substantially conical radially projecting teeth having a rounded tip and alternately inclined in one direction and in the other with respect to the mean transverse plane of the roller.

2. A roller for rolling massage apparatus comprising a hub of hard material and radially projecting teeth carried by said hub, said teeth being made of flexible material and of substantially conical shape with a rounded tip, and said teeth being alternately inclined in one direction and in the other with respect to the mean transverse plane of the roller.

3. A massage apparatus comprising two parallel rollers each having interdigitating conical teeth, the base of each tooth being on the roller, and the longitudinal axis thereof at an angle to the axis of the roller.

4. A hand operated portable massage apparatus comprising a frame embodying two parallel rods; a plurality of massaging rollers loose on each of said rods, the mean transverse plane of each roller on one of said rods being situated midway of the mean transverse planes of two successive rollers on the other one of said rods; and each roller being formed with radially projecting teeth of flexible material alternately inclined in one direction and in the other with respect to the mean transverse plane of the roller, the outer diameter of each roller being larger than the distance between the axes of said rods.

ALBERT BELLEVILLE.

REFERENCES CITED

The following references are of record in the file of this patent:

UNITED STATES PATENTS

| Number | Name | Date |
|---|---|---|
| 1,310,950 | Heagany | July 22, 1919 |
| 1,731,900 | Jordan | Oct. 15, 1929 |
| 1,780,479 | Griffith | Nov. 4, 1930 |
| 2,003,272 | Betz | May 28, 1935 |